(12) United States Patent
Lazzaroni Andina

(10) Patent No.: US 12,568,976 B2
(45) Date of Patent: Mar. 10, 2026

(54) INDUSTRIAL BAKING PAN WITH INTERCHANGEABLE INSERT

(71) Applicant: SAN CRISTOFORO SOLUTIONS SRL, Biella (IT)

(72) Inventor: Giulio Lazzaroni Andina, Milan (IT)

(73) Assignee: SAN CRISTOFORO SOLUTIONS SRL, Biella (IT)

( * ) Notice: Subject to any disclaimer, the term of this patent is extended or adjusted under 35 U.S.C. 154(b) by 92 days.

(21) Appl. No.: 18/689,721

(22) PCT Filed: Aug. 10, 2022

(86) PCT No.: PCT/IB2022/095001
§ 371 (c)(1),
(2) Date: Mar. 6, 2024

(87) PCT Pub. No.: WO2023/037351
PCT Pub. Date: Mar. 16, 2023

(65) Prior Publication Data
US 2025/0000100 A1 Jan. 2, 2025

(30) Foreign Application Priority Data

Sep. 8, 2021 (IT) ........................ 102021000023246

(51) Int. Cl.
*A21B 3/13* (2006.01)
(52) U.S. Cl.
CPC ..................................... *A21B 3/13* (2013.01)

(58) Field of Classification Search
CPC ........... A21B 3/13; A21B 3/131; A21B 3/132; A21B 3/133; A21B 3/134; A21B 3/15;
(Continued)

(56) References Cited

U.S. PATENT DOCUMENTS 1,229,282 A * 6/1917 Katzinger .......... B65D 21/0204
220/23.4
1,229,825 A * 6/1917 Tomlinson ............... A21B 3/13
249/163
(Continued)

FOREIGN PATENT DOCUMENTS

DE 88 02 549 U1 4/1988
EP 2 014 171 A1 1/2009
(Continued)

OTHER PUBLICATIONS

Nov. 23, 2022 International Search Report issued in International Patent Application No. PCT/IB2022/095001.
(Continued)

*Primary Examiner* — Gideon R Weinerth
(74) *Attorney, Agent, or Firm* — Oliff PLC

(57) ABSTRACT

An industrial baking pan with an interchangeable insert, includes a perimeter frame including a plurality of bars joined together, an interchangeable insert delimiting a support surface for a product to be baked and removably attachable to the perimeter frame, clip fasteners connected or connectable to the interchangeable insert. Each clip fastener is snap-on engaged or engageable astride one of the bars of the perimeter frame and a cross-section of the bar has seats configured to snap the clip fastener in place.

15 Claims, 17 Drawing Sheets

(58) Field of Classification Search
CPC . A21B 3/155; A21B 3/00; A47J 37/01; Y10T
24/44769; Y10T 24/44017; Y10T
24/7176; Y10T 24/344
USPC ......... 52/127.8; 99/353, 426, 384, 441, 422;
220/573.1; 403/397
See application file for complete search history.

(56) References Cited

U.S. PATENT DOCUMENTS

| | | | | |
|---|---|---|---|---|
| 1,262,481 A | * | 4/1918 | Haigh | A21B 3/134 |
| | | | | 220/23.2 |
| 1,280,019 A | * | 9/1918 | Haigh | A21B 3/134 |
| | | | | 220/23.2 |
| 1,290,982 A | * | 1/1919 | Haigh | B65D 21/0204 |
| | | | | 220/23.4 |
| 1,291,491 A | * | 1/1919 | Haigh | B65D 21/0204 |
| | | | | 220/23.4 |
| 1,302,662 A | * | 5/1919 | Jackson | A21B 3/134 |
| | | | | 312/111 |
| 1,321,204 A | * | 11/1919 | Haigh | B65D 21/0204 |
| | | | | 220/23.4 |
| 1,333,515 A | * | 3/1920 | Thompson | G09F 3/20 |
| | | | | 40/658 |
| 1,395,030 A | * | 10/1921 | Biggs | A21B 3/134 |
| | | | | 220/23.2 |
| 1,417,325 A | * | 5/1922 | Hopp | G09F 3/20 |
| | | | | 40/658 |
| 1,470,273 A | * | 10/1923 | Debs | A21B 3/134 |
| | | | | 220/23.4 |
| 1,477,249 A | * | 12/1923 | Debs | A21B 3/134 |
| | | | | 220/23.4 |
| 1,568,742 A | * | 1/1926 | Jung | A21B 3/134 |
| | | | | 220/23.8 |
| 1,627,541 A | * | 5/1927 | Katzinger | A21B 3/134 |
| | | | | 99/428 |
| 1,730,919 A | * | 10/1929 | Debs | A21B 3/134 |
| | | | | 220/641 |
| 1,752,544 A | * | 4/1930 | Sparrow | F16B 41/002 |
| | | | | 411/525 |
| 1,840,310 A | * | 1/1932 | Debs | A21B 3/134 |
| | | | | 220/641 |
| 1,895,656 A | * | 1/1933 | Gadke | A47G 33/105 |
| | | | | 24/339 |
| 2,005,449 A | * | 6/1935 | Arrowsmith | A21B 3/134 |
| | | | | 206/503 |
| 2,037,759 A | * | 4/1936 | Chandonia | A21B 3/134 |
| | | | | 220/23.2 |
| 2,168,470 A | * | 8/1939 | Chandonia | A21B 3/155 |
| | | | | 220/23.2 |
| 2,218,644 A | * | 10/1940 | Horak | A21B 3/13 |
| | | | | 220/23.6 |
| 2,523,785 A | * | 9/1950 | Sereno | E04G 7/14 |
| | | | | 403/397 |
| 2,915,213 A | * | 12/1959 | Bishop | A21B 3/133 |
| | | | | 220/23.4 |

| | | | | |
|---|---|---|---|---|
| 3,247,558 A | * | 4/1966 | Kaufman | G03B 21/328 |
| | | | | 24/457 |
| 3,589,660 A | * | 6/1971 | Dunckel | F21V 21/02 |
| | | | | 52/39 |
| 4,455,926 A | * | 6/1984 | Paaskesen | A21B 1/48 |
| | | | | 99/422 |
| 4,688,961 A | * | 8/1987 | Shioda | F16B 7/04 |
| | | | | 24/339 |
| 4,706,342 A | * | 11/1987 | Yu | B42F 1/02 |
| | | | | 24/67.9 |
| 4,960,354 A | * | 10/1990 | Moore | F16B 41/002 |
| | | | | 403/397 |
| 5,335,890 A | * | 8/1994 | Pryor | A47H 15/02 |
| | | | | 248/343 |
| 5,653,412 A | * | 8/1997 | Martorano | F21V 21/34 |
| | | | | 362/418 |
| 5,690,019 A | * | 11/1997 | Barker | A21B 3/134 |
| | | | | 426/138 |
| 6,141,838 A | * | 11/2000 | Cooper | A45D 42/02 |
| | | | | 24/339 |
| 6,409,415 B1 | * | 6/2002 | Toder | E04B 9/006 |
| | | | | 52/39 |
| 7,673,410 B1 | * | 3/2010 | Buerchner | A47F 13/00 |
| | | | | 24/336 |
| 9,332,766 B2 | * | 5/2016 | Tingley | A21B 3/139 |
| 9,643,636 B2 | * | 5/2017 | Parnell | B62B 3/102 |
| 9,936,707 B2 | * | 4/2018 | Tingley | A21B 3/132 |
| 10,182,681 B1 | * | 1/2019 | Hart | A23G 1/0076 |
| 2003/0038137 A1 | * | 2/2003 | Tingley | A21B 3/132 |
| | | | | 220/573.1 |
| 2004/0055475 A1 | * | 3/2004 | Canicas | A21B 3/155 |
| | | | | 99/353 |
| 2005/0204932 A1 | * | 9/2005 | Tingley | A21B 3/15 |
| | | | | 99/445 |
| 2006/0230947 A1 | | 10/2006 | Poppe | |
| 2012/0118174 A1 | * | 5/2012 | Ji | B21D 13/02 |
| | | | | 99/441 |
| 2014/0272056 A1 | * | 9/2014 | Parth | A21D 13/32 |
| | | | | 426/496 |
| 2015/0335034 A1 | * | 11/2015 | Hayrula | A21B 3/13 |
| | | | | 29/428 |
| 2017/0318820 A1 | * | 11/2017 | Lim | A21B 3/15 |
| 2022/0322682 A1 | * | 10/2022 | Oudot | A47J 36/025 |
| 2025/0000100 A1 | * | 1/2025 | Lazzaroni Andina | A21B 3/15 |

FOREIGN PATENT DOCUMENTS

| | | | |
|---|---|---|---|
| EP | 2 033 523 A1 | 3/2009 | |
| EP | 2 708 129 A1 | 3/2014 | |
| ES | 1 014 674 U | 4/1991 | |
| ES | 1 042 126 U | 8/1999 | |

OTHER PUBLICATIONS

Nov. 23, 2022 Written Opinion of the International Searching Authority issued in International Patent Application No. PCT/IB2022/095001.

* cited by examiner

FIG.17
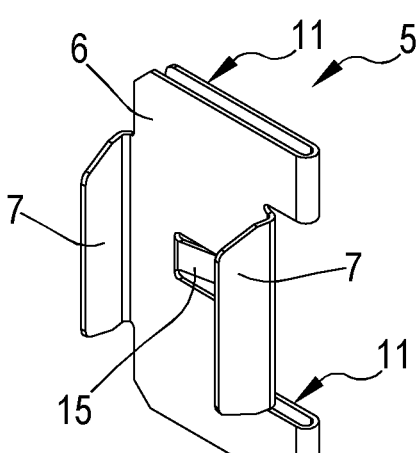
FIG.18
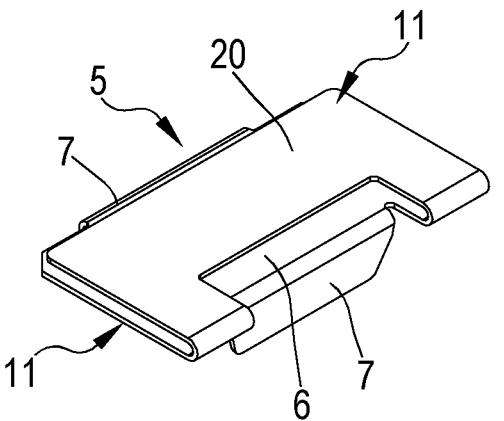
FIG.19

FIG.20
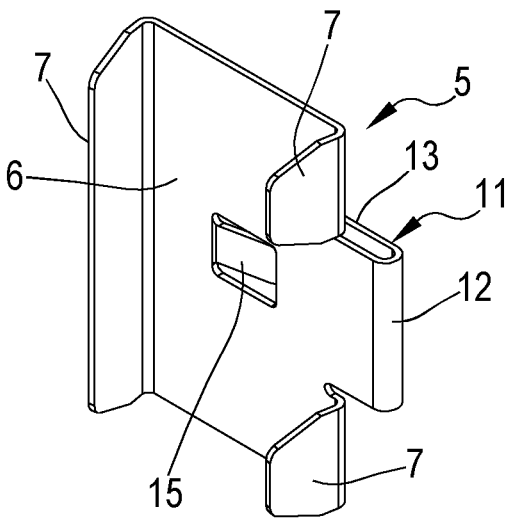
FIG.21
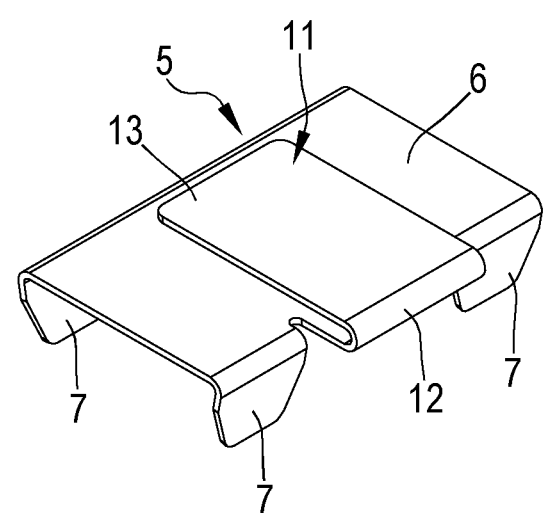
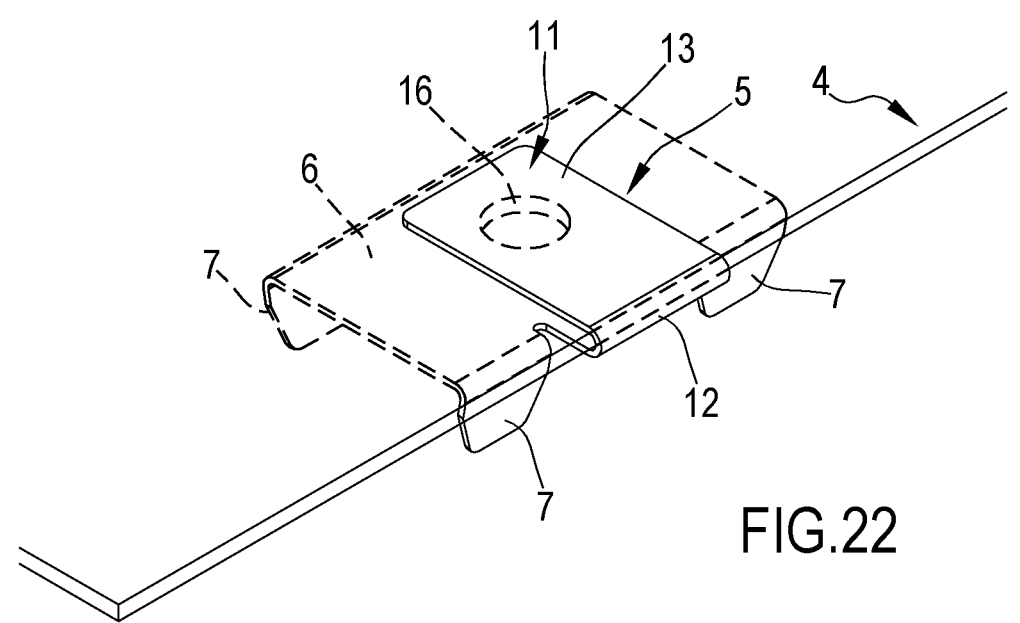
FIG.22

FIG.23
FIG.24
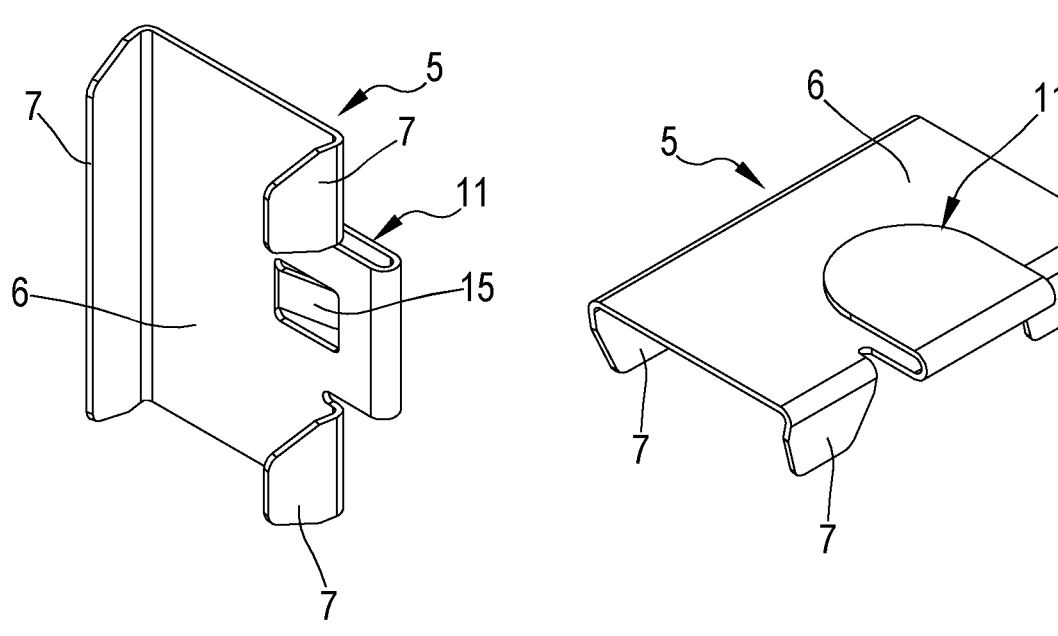
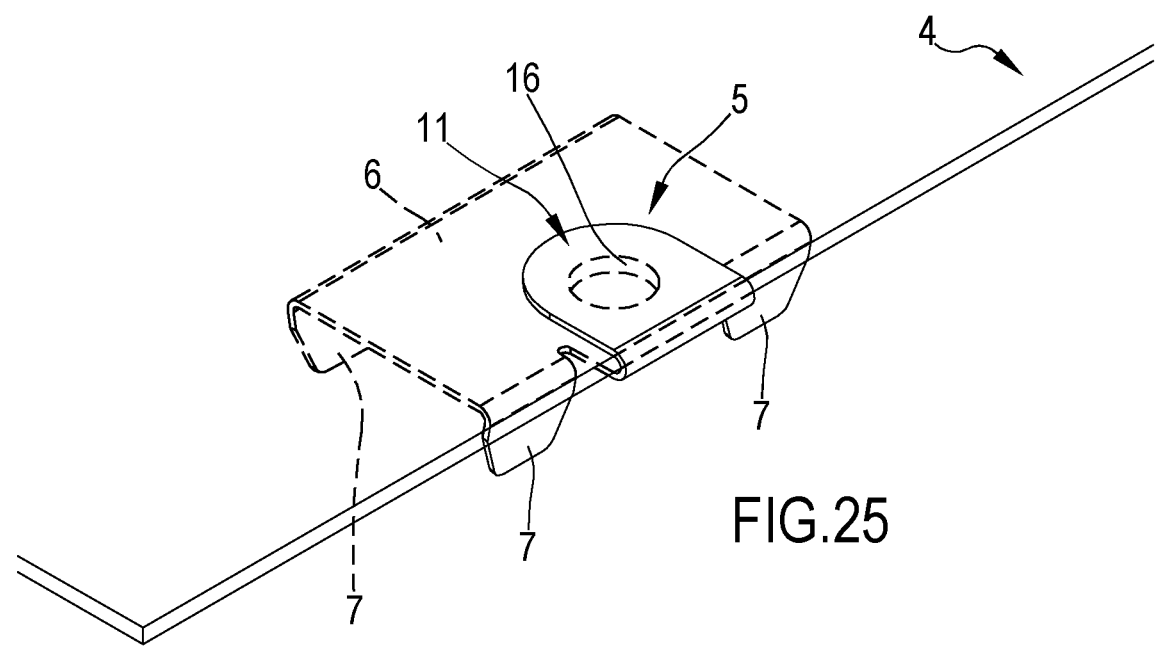
FIG.25

FIG.31
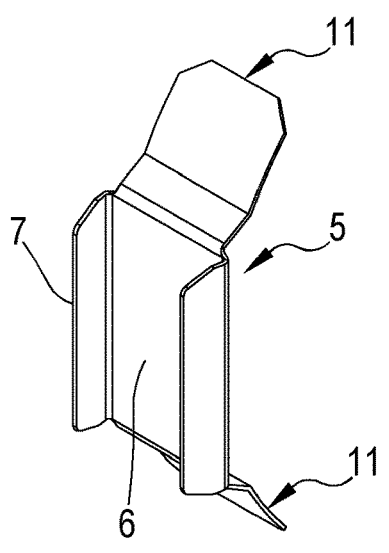
FIG.32
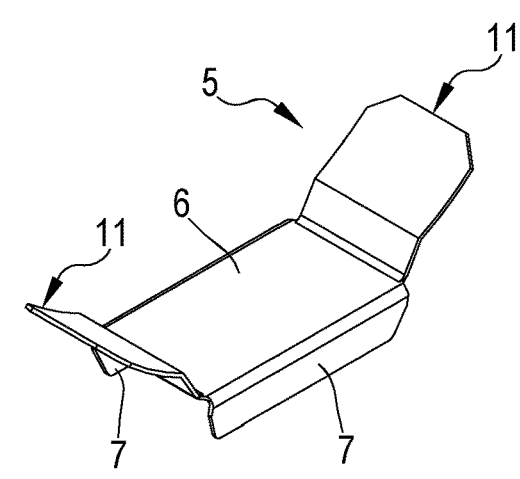
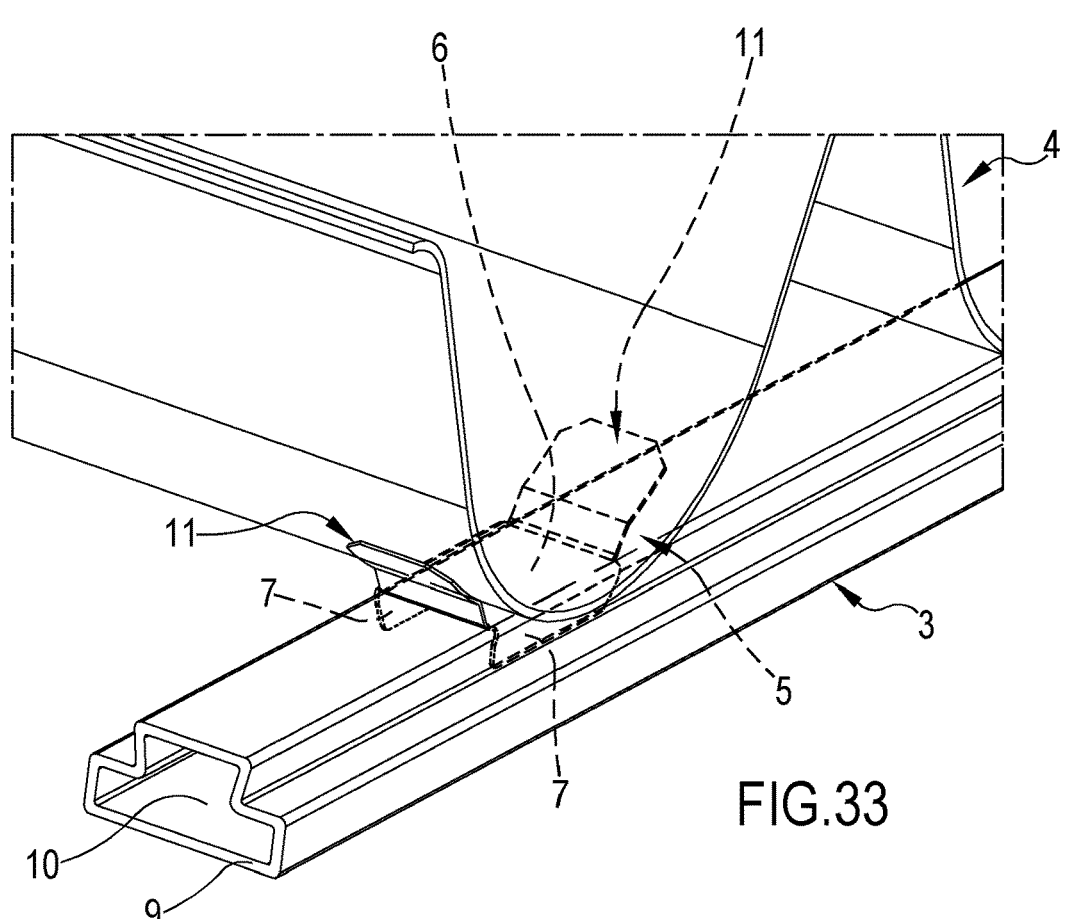
FIG.33

FIG.34                                    FIG.35
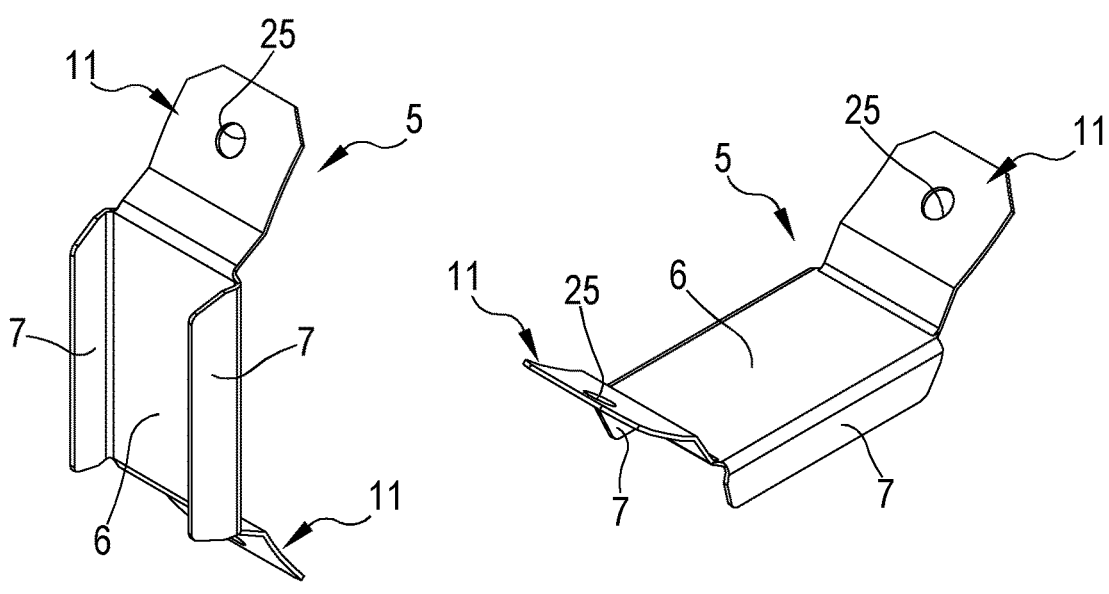
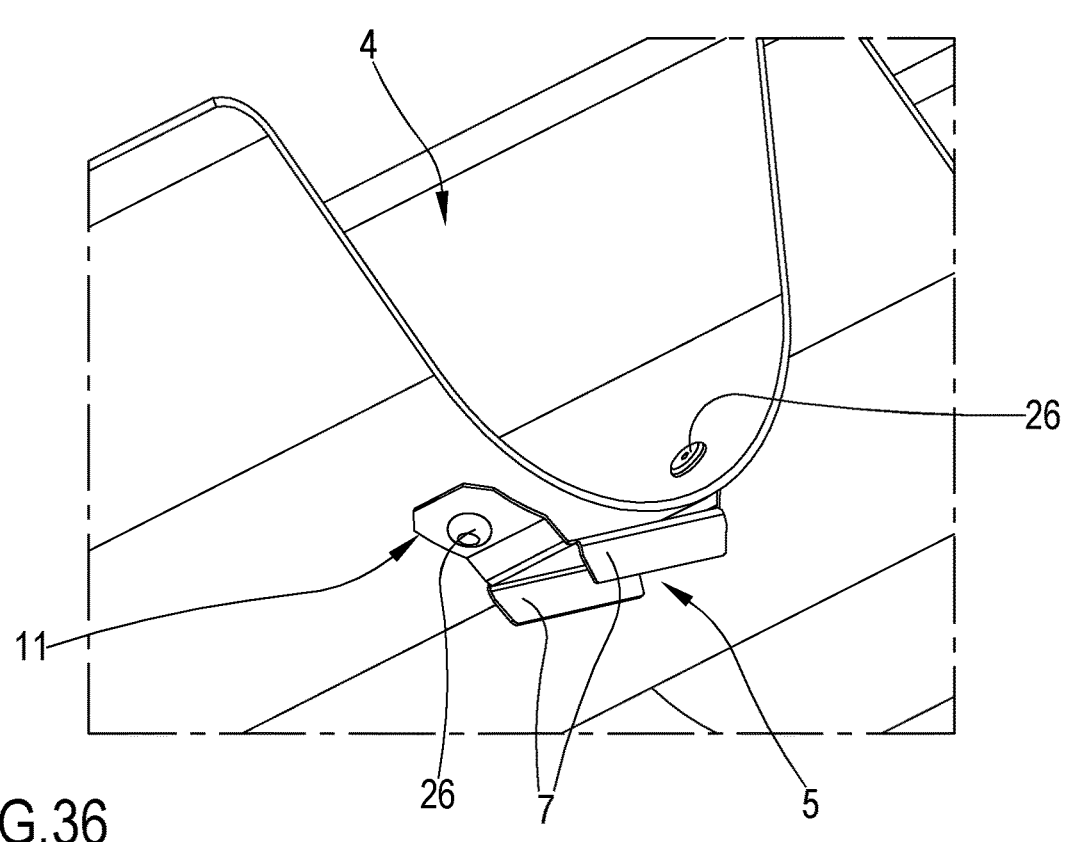
FIG.36

FIG.37
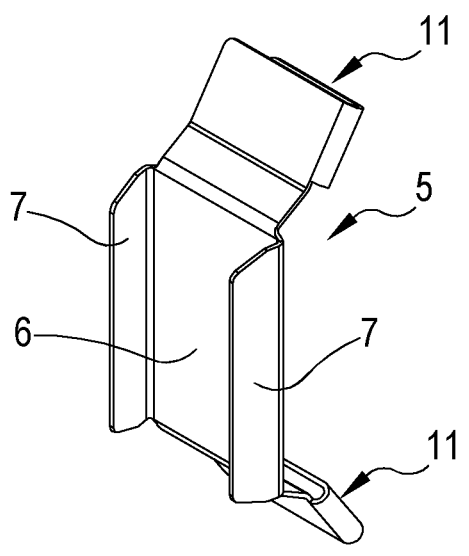
FIG.38
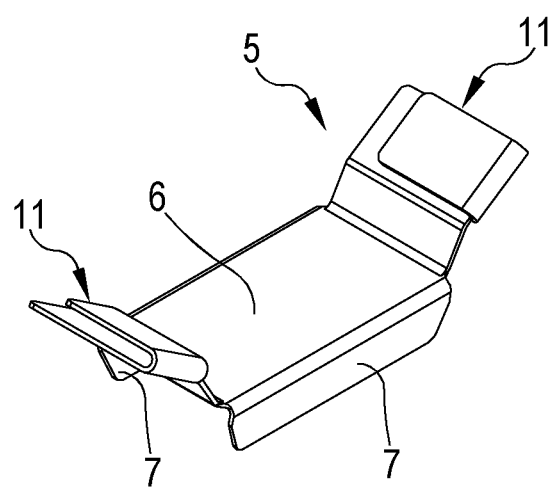
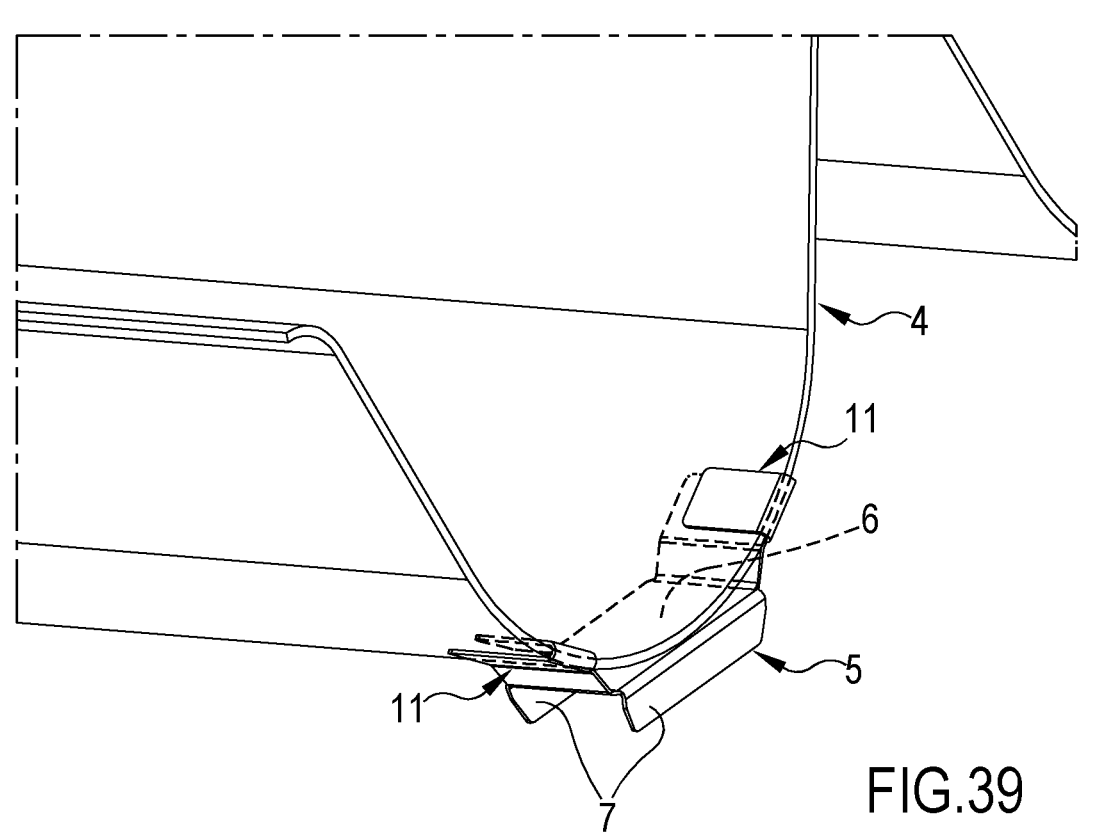
FIG.39

FIG.40
FIG.41
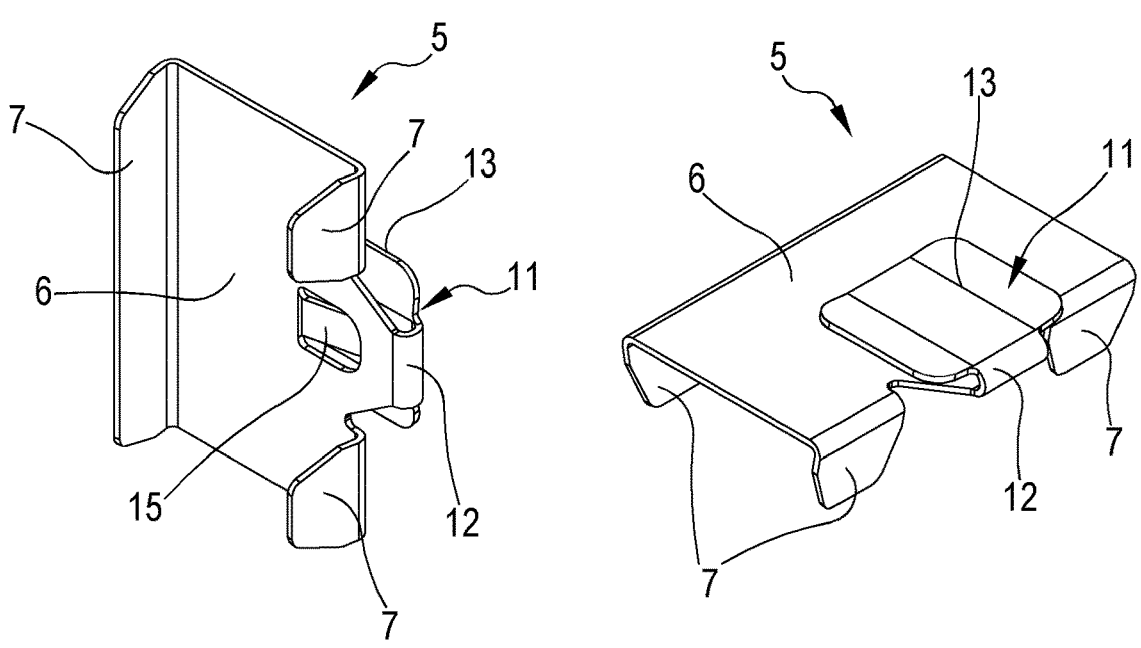
FIG.42
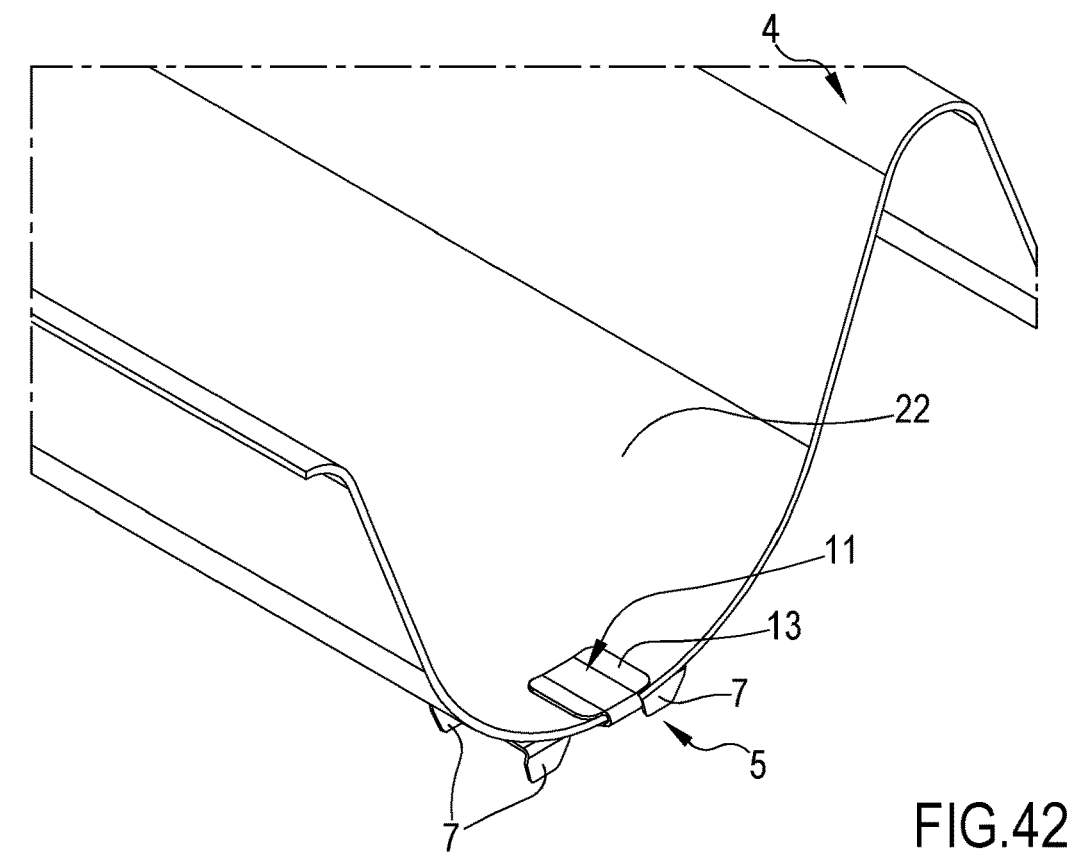

FIG.43
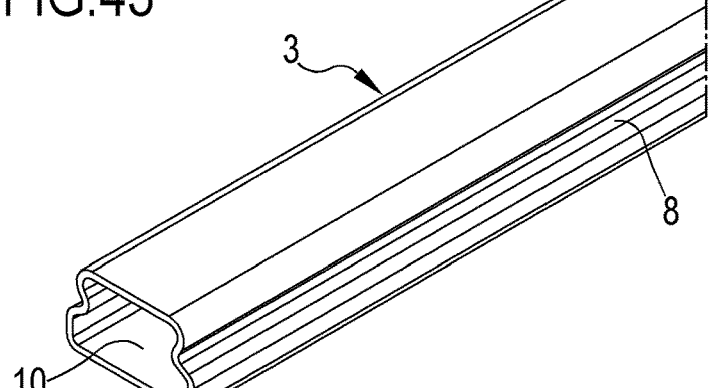
FIG.44
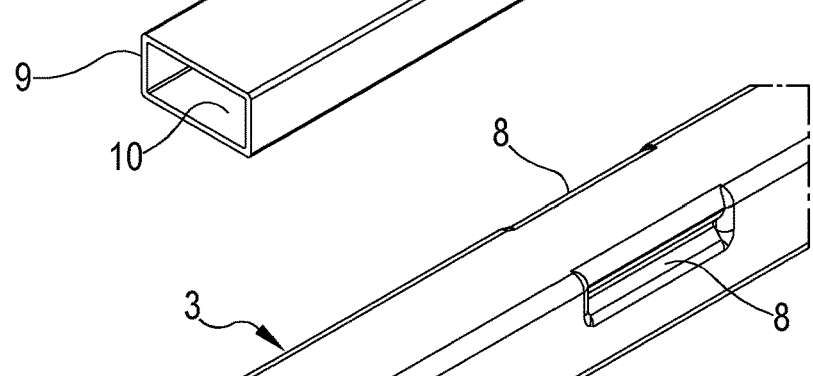
FIG.45
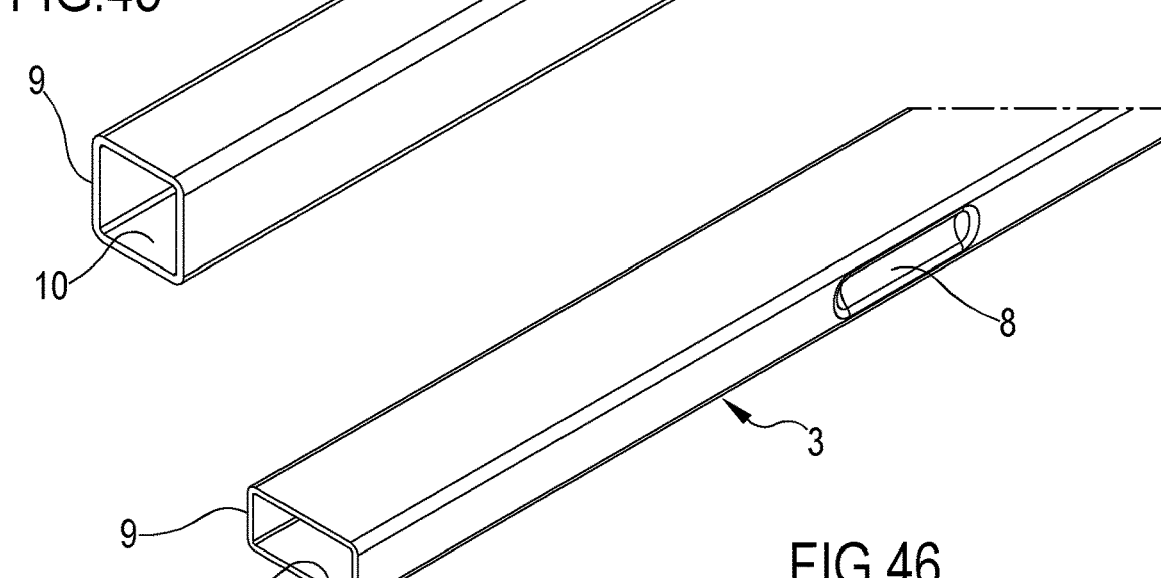
FIG.46

INDUSTRIAL BAKING PAN WITH INTERCHANGEABLE INSERT

FIELD OF THE INVENTION

The present invention relates to an industrial baking pan with an interchangeable insert.

The present one refers to baking pans used in industrial plants for the production of bakery products, such as bread, pizza, focaccia, cakes, brioche and the like. In such plants, the baking pans themselves are automatically moved along guides and pass through all or some of the areas of the specific production process, such as forming, leavening, baking, cooling, etc.

STATE OF THE ART

As is well known, such baking pans comprise a frame usually made of steel profiles. The frame carries a surface, called an insert, on which the products to be baked rest. The frame serves to provide rigidity and to allow transport along the lines of the plant. The insert is used to support and transport the baked products.

They are well known industrial baking pans in which the insert is fixed to the frame by means of rivets which pass through the insert itself and the frame profile underneath, to lock them together. After a certain number of working hours/cycles, the inserts have to be replaced because they get damaged, so it is necessary to remove the rivets and rivet new ones.

There are also known industrial baking pans in which the insert is fixed to the frame by means of other systems designed to facilitate the removal and interchangeability of the insert.

Document EP2708129 discloses an industrial baking tray comprising a perimeter frame on which an interchangeable insert is mounted. The insert is attached to the perimeter frame by tabs that protrude from the insert and are bent or crimped around a bar of the frame.

Document US2003038137 discloses a system comprising a frame and an insert that are connected to each other by folding the insert around the frame in predetermined zones.

Document US2004055475A1 discloses a baking pan comprising an insert formed by a plurality of elements overlapping on a frame and secured to the frame by staples that can be manually positioned and removed with the aid of a punch.

US2006230947 discloses a cooking pan having plastic material modules comprising hooks or tabs for engaging them with a metal frame.

Document ES1042126U illustrates a bread baking tray comprising a corrugated plate and a frame for supporting the same. The corrugated plate has flat expansions, on at least two opposite sides, in which flat areas are arranged elastic tongues, capable of being pressed into a longitudinal groove of the upper face of the frame and being retained within the groove.

Definitions

The expression "removable" as used in the present description and in the appended claims means that the elements coupled, constrained, mounted to each other can be assembled and disassembled without damaging them.

SUMMARY OF THE INVENTION

The Applicant noted that known industrial baking pans, such as those described above can be improved in several respects.

The Applicant observed in particular that the traditional solutions which use rivets and therefore necessarily drill holes in the frame profiles do not allow proper hygiene to be ensured. In fact, drilling the holes generates metal dust which is not detectable by metal detectors and can remain on the baking pan or inside the profile, contaminating the baked goods. Furthermore, dirt and washing liquids, used after a certain number of working cycles for the necessary cleaning operations, can penetrate into the profiles through the rivet holes and accumulate and then escape during the handling of the pans in the system, contaminating the baked goods.

The Applicant also noted that the solutions described in EP2708129 and US2003038137, which deform parts of the inserts in order to fold them around the frame, may result in damage to the insert or even, after several bending cycles, breakage of the parts intended to be deformed. Moreover, the Applicant also noted that the bending operations are slow and require specific tools and skilled labor. Applicant also noted that the staple and frame structures of US2004055475A1 and the hooks of US2006230947 and their operation are not illustrated at all in the respective documents.

Therefore, the Applicant felt the need to propose an attachment system between the frame and the insert that would improve the known systems.

In particular, the Applicant has set itself the objective of proposing an attachment system for industrial baking pans with interchangeable inserts which allows the inserts to be assembled and disassembled on the respective frames in a relatively simple, fast and safe manner.

The Applicant has also set itself the objective of proposing industrial baking pans with interchangeable inserts to reduce the time and cost of insert replacement.

The Applicant has also set out to propose an attachment system that can be put in place without the need for highly skilled labour.

The Applicant has also set itself the objective of offering industrial baking pans with interchangeable inserts that ensure hygiene and non-contamination of the products being baked.

The Applicant has also set itself the objective of offering industrial baking pans with interchangeable inserts that are more reliable and durable than those known in the art.

The Applicant has found that the objectives listed above and others can be substantially achieved by using clip fasteners that are attached to the insert and that snap into engagement astride the frame bars.

In particular, Applicant has found that the objectives listed above and others can be substantially achieved by an industrial baking pan with an interchangeable insert according to one or more of the appended claims and/or according to one or more of the following aspects.

According to a first aspect, the present invention relates to an industrial baking pan with an interchangeable insert, comprising:

a perimeter frame comprising at least one bar;

at least one interchangeable insert delimiting a support surface for a product to be baked and removably attachable to the perimeter frame;

at least one clip fastener connected or connectable to said at least one interchangeable insert;

wherein said at least one clip fastener is snap-on engaged or engageable astride said at least one bar of said perimeter frame and wherein a cross-section of said at least one bar has seats configured to snap said clip fastener in place.

The Applicant has verified that the baking pan according to the invention allows, first of all, to mount and dismount the insert on/from the frame in a fast, safe and relatively simple way, reducing the time and cost of insert replacement.

The Applicant has verified that the insert can be removed from the frame without damaging the frame.

The Applicant has verified that optionally the insert can be removed from the frame without damaging the insert either.

The Applicant has verified that optionally the insert can be mounted and removed on/from the frame without damaging even the clip inserts.

The Applicant has also verified that the aforementioned assembly and disassembly of the baking pans according to the invention can be properly performed by a simple maintenance person without the need for highly skilled labor.

The Applicant has also verified that the baking pan according to the invention avoids contamination of the products being baked related to the cleaning and/or assembly/disassembly operations of the inserts.

The Applicant has also verified that the baking pan according to the invention is more reliable and durable than those of known in the art.

The Applicant has also verified that the clip fasteners allow a relative sliding of the insert/frame and this allows to compensate for possible different thermal expansion of the interchangeable insert, which is for example made of aluminum, and of the perimeter frame, which is for example made of steel.

Further aspects of the present invention are set forth below.

In one aspect, the industrial baking pan comprises a plurality of clip fasteners.

In one aspect, the seats are recesses shaped in an outer surface of said at least one bar.

In one aspect, an upper portion of the bar snap-on engaged or engageable with the clip fastener has a profile conjugate or complementary to an internal profile of the clip fastener.

In one aspect, the seats extend continuously along an entire longitudinal development of said at least one bar. The clip fasteners may be slidable along the bar and freely positioned. For example, the bar is a profile having a constant cross-section and the seats are defined by longitudinal grooves extending along the entire length of the profile.

In one aspect, the seats are located at discrete positions of said at least one bar. In this event, the locations of the clip fasteners along the bar are predetermined. For example, the bar is a profile having a square, rectangular or round cross-section and the seats are ashlars/recesses formed only where the clip fasteners are installed.

In one aspect, the seats have a length greater than a length of the clip fasteners, measured along the longitudinal development of the bar, to allow for some mutual sliding between the interchangeable insert and the perimeter frame. This allows, for example, to compensate for possible different thermal expansion of the interchangeable insert and the perimeter frame.

In one aspect, said at least one bar comprises a closed perimeter wall delimiting an internal cavity.

In one aspect, the seats are non-through recesses formed in the closed perimeter wall.

In one aspect, the bar seats are connected to a top surface of said bar by curved and convex portions.

In one aspect, an outline of the closed perimeter wall at each of the seats has an S-shape or a Z-shape.

In one aspect, said at least one bar is a tube and said recesses do not pass through the closed perimeter wall of the tube.

In one aspect, said at least one bar is also closed at its ends. In this way, any infiltration and accumulation of potentially contaminating material in the bar is prevented.

In one aspect, said at least one bar has a top surface facing said at least one insert, a bottom surface opposite said top surface, and two side surfaces. In one aspect, the seats are formed in the two side surfaces or between each of the two side surfaces and the top surface.

In one aspect, the perimeter frame is located at peripheral portions of said at least one insert, optionally at edges of said at least one insert.

In one aspect, the perimeter frame comprises a plurality of bars joined together.

In one aspect, the bars are located at peripheral portions of said at least one insert.

In one aspect, the perimeter frame is made of metal, optionally steel.

In one aspect, only some of the bars have the seats configured to snap the clip fasteners into.

In one aspect, all of the bars have the seats configured to snap the clip fasteners into.

In one aspect, the perimeter frame has a square or rectangular shape in plan.

In one aspect, the perimeter frame comprises four bars joined together to form a square or rectangle, and each bar has the seats configured to snap the clip fasteners into.

In one aspect, the perimeter frame comprises two bars that are parallel to each other and spaced apart joined together by end profiles and only the two bars that are parallel to each other have the seats configured to snap the clip fasteners into.

In an optional aspect, said at least one clip fastener has a cross-section having a substantially U-shaped outline.

In one aspect, said at least one clip fastener comprises tabs configured to dispose on opposite sides of the bar and to snap into the seats.

In one aspect, said at least one clip fastener comprises connecting devices configured to connect the clip fastener to said at least one interchangeable insert.

In one aspect, said connecting devices comprise: welds, rivets, interlocks or snap-on couplings.

In one aspect, said at least one clip fastener comprises a main portion, wherein the tabs are disposed on edges of the main portion, optionally wherein at least two of said tabs are developed from opposite edges of the main portion.

In an aspect, the connecting devices are disposed on the main portion and/or extend from the main portion and/or are connected to the main portion and/or to at least one of the tabs.

In one aspect, when the baking pan is assembled, the main portion of said at least one clip fastener is interposed between said at least one interchangeable insert and said at least one bar.

In one aspect, the main portion is flat.

In one aspect, the tabs are develop away from a side of a lying plane of said main portion.

In one aspect, each of the tabs is at least partially counter-shaped to the respective seat, i.e., has a shape at least partially complementary to a shape of the respective seat.

In one aspect, the connecting devices are located on a side of the lying plane of the main portion opposite to the side of said lying plane into which the tabs extend.

In one aspect, the connecting devices comprise at least one flap developing from the main portion or from at least one of the tabs.

In one aspect, said at least one flap is located on an edge of the main portion from which the at least one of the tabs is also developed.

In one aspect, said at least one flap is located on an edge of the main portion other than the edges from which the tabs develop.

In one aspect, the connecting devices comprise two flaps developing from opposite edges of the main portion.

In one aspect, said at least one flap is welded to said at least one interchangeable insert.

In one aspect, said at least one flap is riveted to said at least one interchangeable insert.

In one aspect, said at least one flap is interlocked with said at least one interchangeable insert.

In one aspect, said at least one flap is snap-engaged with said at least one interchangeable insert.

In one aspect, said at least one flap is inserted into a housing formed in said at least one interchangeable insert.

In one aspect, said at least one flap is shaped, optionally dovetailed, to engage, optionally to snap engage, into a housing formed in said at least one interchangeable insert.

In one aspect, an edge of said at least one interchangeable insert is sandwiched between said at least one flap and the main portion of the clip fastener.

In one aspect, said at least one flap and the main portion delimit between them a recess configured to receive an edge of said at least one interchangeable insert.

In one aspect, said at least one flap is shaped to delimit a recess configured to receive an edge of said at least one interchangeable insert.

In one aspect, said at least one flap has a safety appendage engaged or configured to engage, optionally to snap engage, in a cavity of said at least one interchangeable insert when the edge of said at least one interchangeable insert is positioned in the recess.

In one aspect, said at least one clip fastener comprises a single piece of shaped material, optionally cut and folded or stamped.

In one aspect, said at least one interchangeable insert is one piece.

In one aspect, said at least one interchangeable insert is rigid in the sense that it is capable of supporting the products to be baked without deforming under their weight.

In one aspect, said at least one interchangeable insert is defined by a flat plate.

In one aspect, said at least one interchangeable insert is a shaped plate, optionally corrugated, for delimiting concavities suitable for receiving products to be baked.

In one aspect, said at least one interchangeable insert is made of plastic or metal, optionally aluminum.

In one aspect, said at least one interchangeable insert comprises a plurality of interchangeable inserts.

The present invention also relates to an industrial plant for producing baked goods, such as, for example, bread, pizzas, focaccia, cakes, brioche and the like, and to an industrial oven for baking said baked goods comprising a plurality of baking pans in accordance with one or more of the preceding aspects.

In one aspect, the plant/oven comprises guides and handling devices for transporting the baking pans along said guides through the at least one cooking zone/station.

Further features and advantages will appear more from the detailed description of preferred, but not exclusive, embodiments of an industrial baking pan with an interchangeable insert in accordance with the present invention.

DESCRIPTION OF DRAWINGS

Such description will be set forth herein with reference to the accompanying drawings, provided for illustrative purposes only and, therefore, not limiting, in which:

FIGS. 17, 18 and 19 illustrate a fourth variant of the element shown in FIGS. 3 and 4;

FIGS. 20, 21 and 22 illustrate a fifth variant of the element shown in FIGS. 3 and 4;

FIGS. 23, 24 and 25 illustrate a sixth variant of the element shown in FIGS. 3 and 4;

FIGS. 31, 32 and 33 illustrate an eighth variant of the element of FIGS. 3 and 4 associated with the baking pan of FIGS. 29 and 30;

FIGS. 34, 35 and 36 illustrate a ninth variant of the element of FIGS. 3 and 4 associated with the baking pan of FIGS. 29 and 30;

FIGS. 37, 38 and 39 illustrate a tenth variant of the element of FIGS. 3 and 4 associated with the baking pan of FIGS. 29 and 30;

FIGS. 40, 41 and 42 illustrate an eleventh variant of the element of FIGS. 3 and 4 associated with the baking pan of FIGS. 29 and 30;

FIGS. 43, 44, 45 and 46 illustrate respective variants of the element of FIG. 5.

DETAILED DESCRIPTION OF EMBODIMENTS OF THE INVENTION

Figures 1, 2:
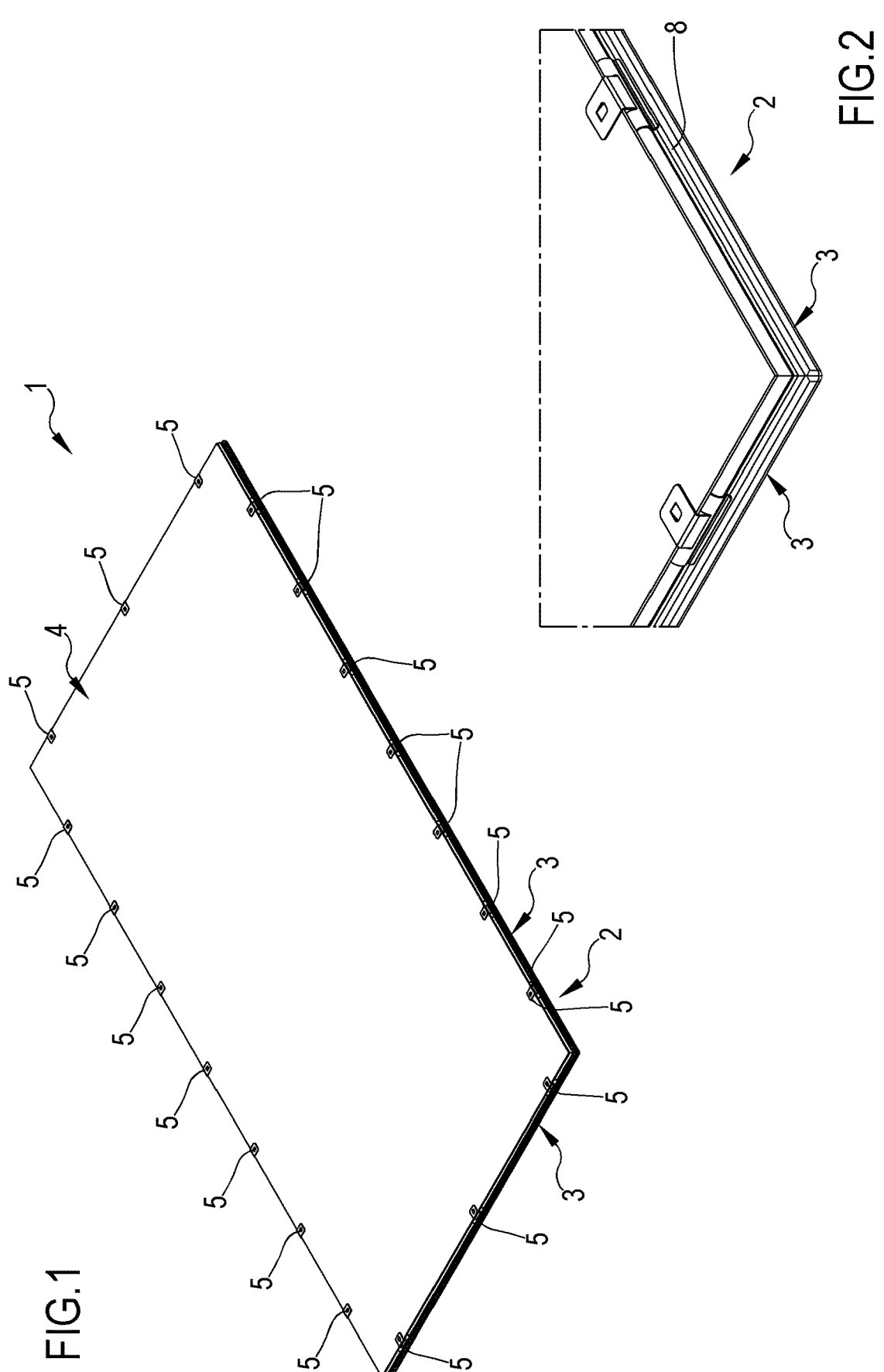
FIG. 1 illustrates an industrial baking pan with an interchangeable insert according to the present invention.
FIG. 2 is an enlargement of a portion of the baking pan in FIG. 1.
Figure 3:
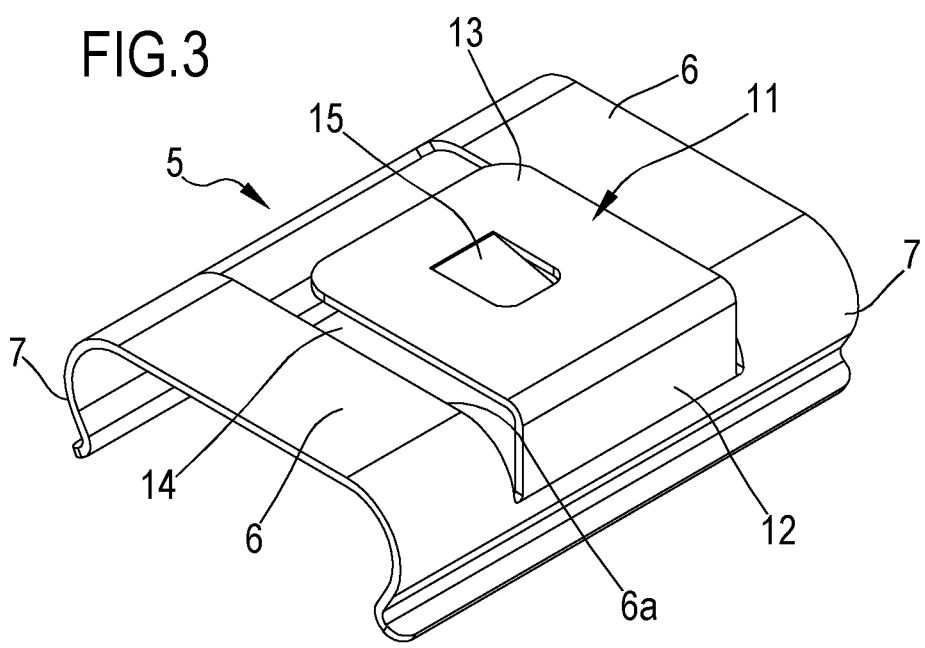
FIG. 3 illustrates an element of the baking pan of FIG. 1.
Figure 4:
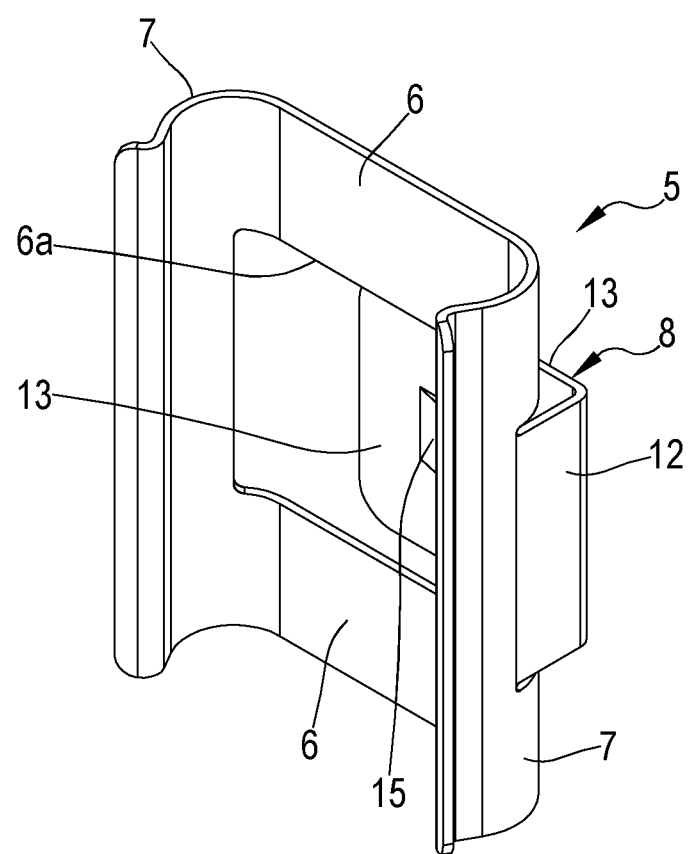
FIG. 4 is a different view of the element in FIG. 3.

In FIG. 1, an industrial baking pan with an interchangeable insert according to the present invention is indicated overall by the number 1. Said baking pan 1 is usable in the context of industrial plants and ovens for the production of bakery products, such as for example bread, pizzas, focaccia, cakes, brioche and the like. In such plants, the baking pans themselves are automatically moved along guides and pass through all or some of the zones of the specific production process, such as forming, leavening, baking, cooling, etc. The baking pans 1 are positioned on the guides and transported along said guides by means of appropriate handling systems through the processing zones/stations.

The baking pan 1 illustrated in FIG. 1, by way of example and not limitation, comprises a perimeter frame 2 and an interchangeable insert 4 removably mounted on the perimeter frame 2.

The interchangeable insert 4 has a support surface for the baked products to be baked and is made of a rigid material, for example plastic or metal for example aluminum, in the sense that it is able to support the products to be baked without deforming under their weight.

The perimeter frame 2 comprises four bars 3, for example steel, arranged in a rectangle (only two of which are visible in FIG. 1) and the interchangeable insert 4 comprises a single flat plate. The bars 3 of the perimeter frame 2 are disposed at peripheral edges of the interchangeable insert 4. These peripheral edges rest on the perimeter frame 2 and are removably constrained to the bars 3 by a plurality of clip fasteners 5. The clip fasteners 5 are snap-on engageable astride the bars 3 of the perimeter frame 2.

In the example embodiment illustrated in FIGS. 1-6, each clip fastener 5 is a single piece of suitably cut, bent and shaped sheet metal. The clip fastener 5 comprises a substantially flat main portion 6 and two tabs 7 extending from opposite edges of the main portion 6. Said tabs 7 extend away from the main portion 6 and on one side of a lying plane of said main portion 6. It follows that the clip fastener has a cross-section having a substantially U-shaped shape (inverted U in FIG. 6) and the U is placed astride the bar 3.

Each of the two tongues 7 develops continuously from the main portion 6 and is connected thereto by a first arcuate portion. A terminal end of each tab 7 has a second arcuate portion with curvature opposite to the first arcuate portion so that said first and second arcuate portions define an S-shape, as evident from the section of FIG. 6. The first arcuate portion delimits an internal concavity and an external convexity to the clip fastener 5. The second arcuate portion delimits an external concavity and an internal convexity to the clip fastener 5.

The clip fastener 5 is configured to engage on the bars 3 of the perimeter frame 2 with a snap-on assembly. For this purpose, each bar 3 has seats 8 configured to snap the tabs 7 of said clip fastener 5 in place.

Figure 5:
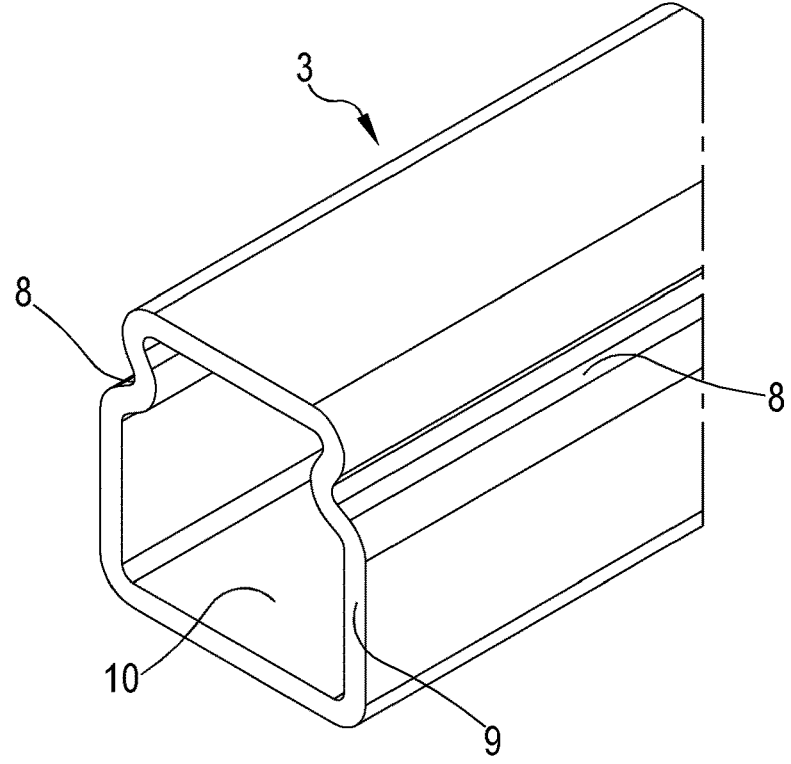
FIG. 5 illustrates a further element of the baking pan of FIG. 1.

In the embodiment of FIGS. 1-6, the bar 3 is an extruded profile having a constant hollow section, i.e. it is a tube (FIG. 5). Each bar 3 therefore has a closed perimeter wall 9 which delimits an internal cavity 10. The bars 3 are connected to each other at their ends so that the internal cavities 10 remain isolated from the external environment.

The bar 3 has an top surface which, when the baking pan 1 is correctly assembled, faces the interchangeable insert 4, a lower surface opposite the top surface and two lateral surfaces. The seats 8 of the bar of FIG. 5 are defined by two recesses or longitudinal grooves obtained in the two lateral surfaces and which extend continuously along the entire longitudinal development of the bar itself 3.

These seats 8 do not pass through the closed perimeter wall 9, so that the internal cavity 10 remains isolated with respect to the external environment.

Figure 6:
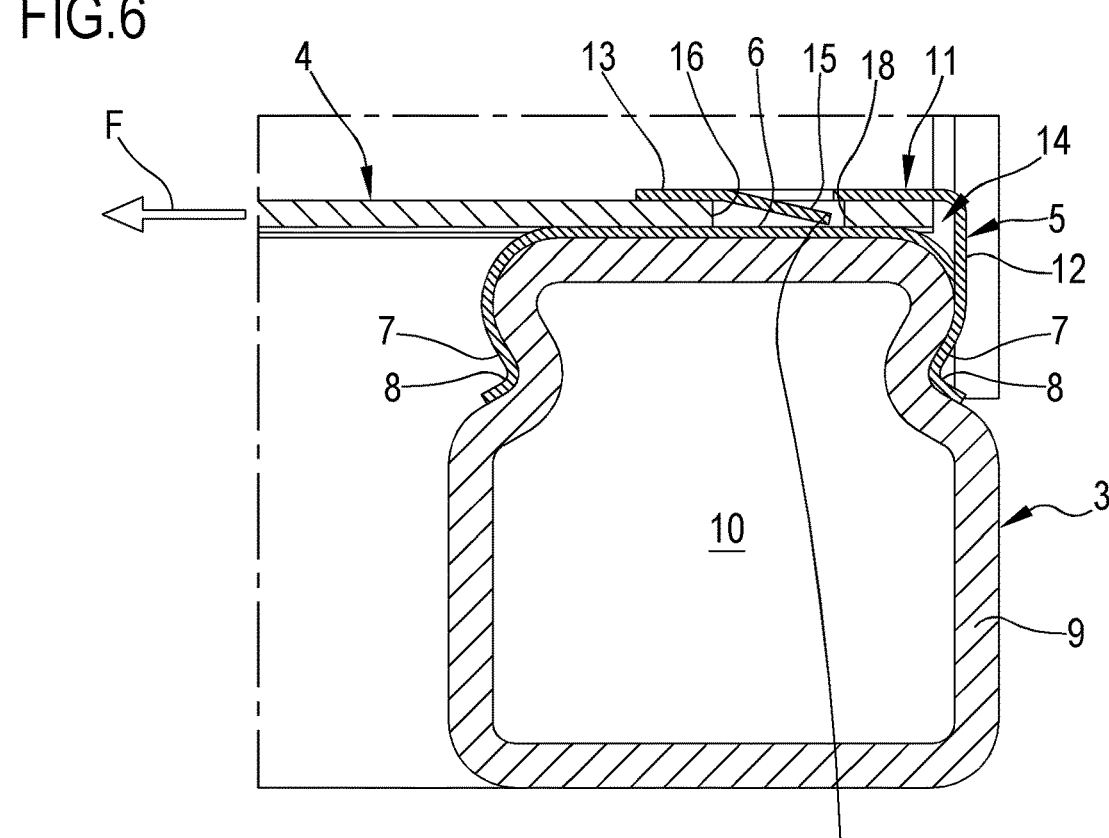
FIG. 6 is a sectional view of a part of the baking pan referred to in the previous figures.

As can be seen by observing FIG. 6, an upper portion of the bar 3 is counter-shaped to the clip fastener 5, in the sense that said upper portion (which also comprises the two seats 8) presents a profile conjugate or complementary to an internal profile of the clip fastener 5 delimited by the main portion 6 and the tabs 7. The two seats 8 of the bar 3 are connected to the top surface of the bar itself 3 by curved and convex portions and the outline of the closed perimeter wall 9 at each of the seats has an S or Z shape (not illustrated in the attached figures).

The clip fastener 5 is affixed to the bar 3 by arranging the two tabs 7 at the aforementioned curved and convex portions and pressing said clip fastener 5 against the bar 3, so as to cause the two tabs 7 to elastically spread apart until the end ends of the tabs 7 snap into the two seats 8 and partially re-approach. The clip fasteners 5 can be slid along the bar 3 and positioned freely. Furthermore, this type of coupling makes it possible to compensate for any different thermal expansion of the interchangeable aluminum insert and the steel perimeter frame when the backing pan 1 is working in the oven.

A central zone of the main portion 6 of the clip fastener 5 is cut out and folded to form a flap defining connecting devices 11 configured to connect the clip fastener 5 to the interchangeable insert 4. In the embodiment of FIGS. 1-6, the central zone in which the flap is cut out defines an opening 6a which divides the main portion 6 into two zones located at the sides of the flap. The flap comprises a first portion 12 spliced to one of the tabs 7 and a second portion 13 disposed parallel to said two zones of the central portion 6. Said second portion 13 is located in a plane spaced apart from the plane of lying of the central portion 6 and on the opposite side with respect to the tabs 7, so that the flap and the main portion 6 delimit between them a recess 14 configured to receive an edge of the interchangeable insert 4. When the backing pan 1 is assembled, the main portion 6 of the clip fastener 5 remains interposed between the interchangeable insert 4 and the respective bar 3.

In the embodiment of FIGS. 1-6, the flap further has a safety appendage 15 cut out within the flap itself and protruding within the recess 14. In addition, the interchangeable insert 4 is provided with cavities or through openings 16 located at its edges (one of which is visible in FIG. 6).

The position of said through openings 16 and the geometry of the safety appendage 15 are such that, when the edge of the interchangeable insert 4 is located in the recess 14, the security appendage 15 elastically snaps into a respective cavity or through opening 16 (as illustrated in FIG. 6) and prevents the edge of the interchangeable insert 4 from protruding from the recess 14. In particular, when the edge of the interchangeable insert 4 is located in the recess 14, the safety appendage 15 extends cantilevered from the flap downwardly and into the through opening 16. In addition, a terminal end 17 of said safety appendage 15 lies facing an inner surface 18 of the through opening 16 placed towards an outer perimeter of the interchangeable insert 4, so that, if said interchangeable insert 4 attempts to be extracted from the recess 14 (according to the direction indicated by the arrow F in FIG. 6), the terminal end 17 of the safety appendage 15 strikes against said inner surface 18 and prevents the interchangeable insert 4 from being extracted from the recess 14.

In use, the clip fasteners 5 are first mounted at the through openings 16 of the interchangeable insert 4 and the safety appendages 15 ensure that the clip fasteners 5 remain in position and prevent said clip fasteners 5, once mounted, from becoming detached during handling and movement of the interchangeable insert 4 and prior to application thereof to the perimeter frame 2.

The interchangeable insert 4 is then disposed on the perimeter frame 2 and the clip fasteners 5 are snapped onto the bars 3 of said perimeter frame 2. When it is necessary to replace one or more interchangeable inserts 4, it is sufficient to disengage them, by separating the clip fasteners 5 from the bars 3 manually or, for example, with the help of a screwdriver. Moreover, as visible in FIG. 4, the opening 6a in the main portion 6 provides access to the safety appendage 15 when the clip fastener 5 is mounted on the interchangeable insert 4 in order to disengage the safety appendage 15 from the through opening 16 made in the interchangeable insert 4 and remove the clip fastener 5 from said interchangeable insert 4.

Figure 7:
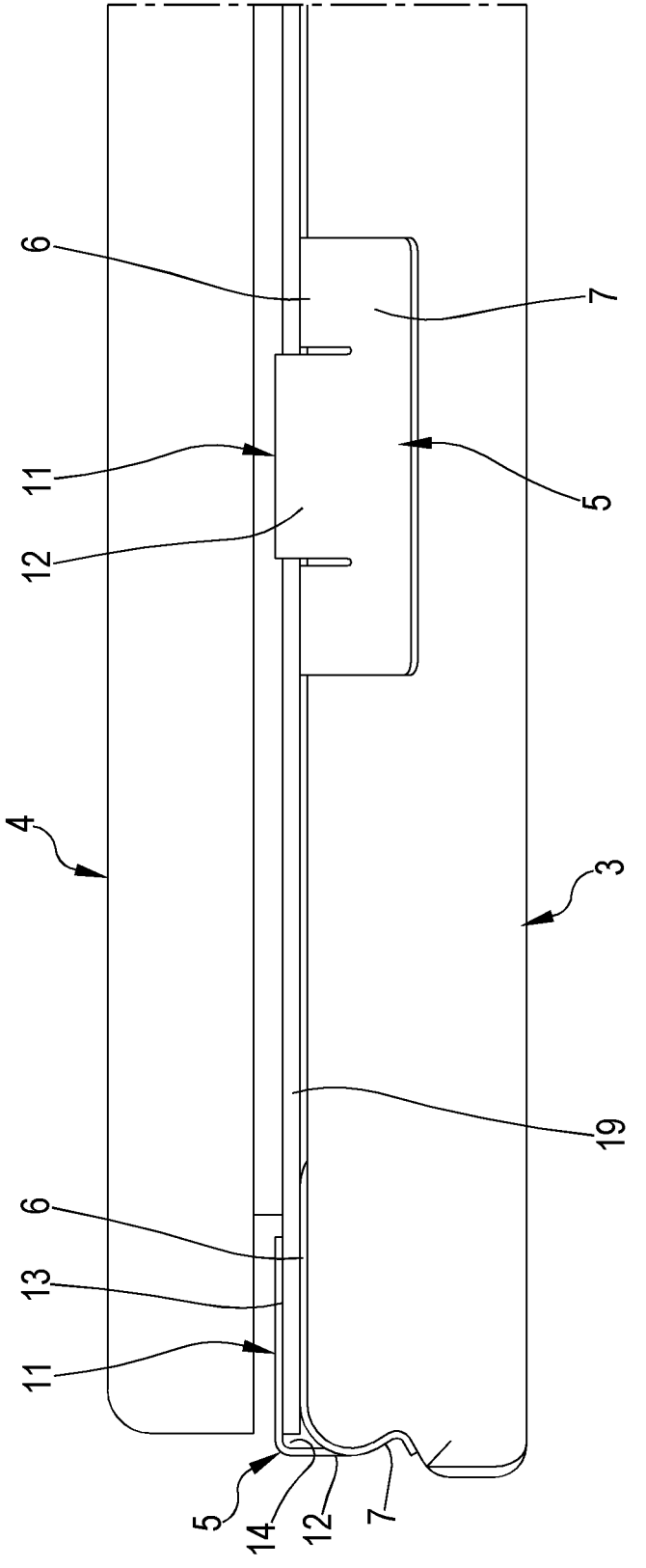
FIG. 7 is a partial side view of an embodiment variant of the baking pan according to the present invention.

FIG. 7 shows an interchangeable "peelboard" type insert 4 in which the bars 3 and the clip fasteners 5 are like those described above and only the structure of the insert 4 changes. As can be seen, the clip fasteners 5 are engaged with the edge of a bottom plate 19 of the interchangeable "peelboard" type insert 4.

FIGS. 8 to 25 illustrate variations of the clip fastener 5 described hereinabove which can be associated with an interchangeable insert 4 of the flat plate type.

Figure 8:
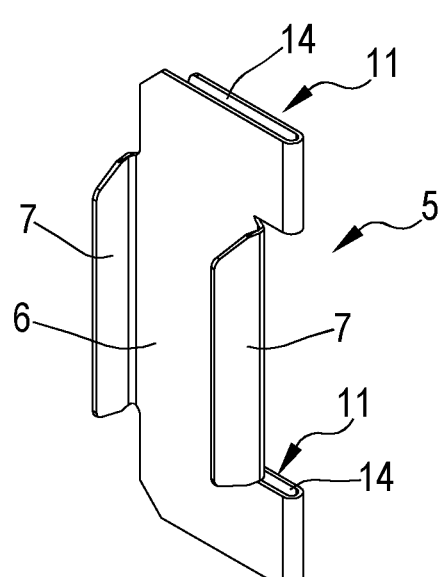
FIGS. 8, 9 and 10 illustrate a first variant of the element shown in FIGS. 3 and 4.
Figure 9:
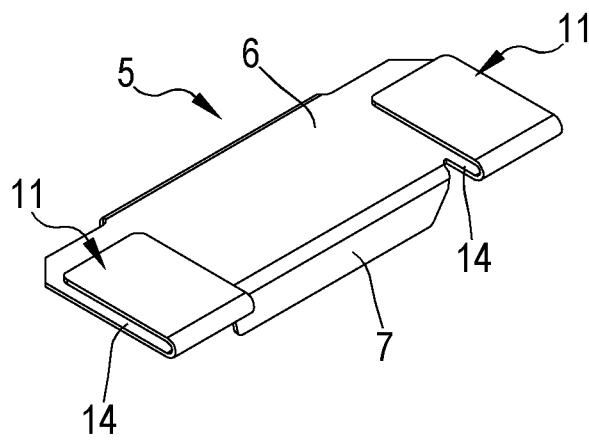
Figure 10:
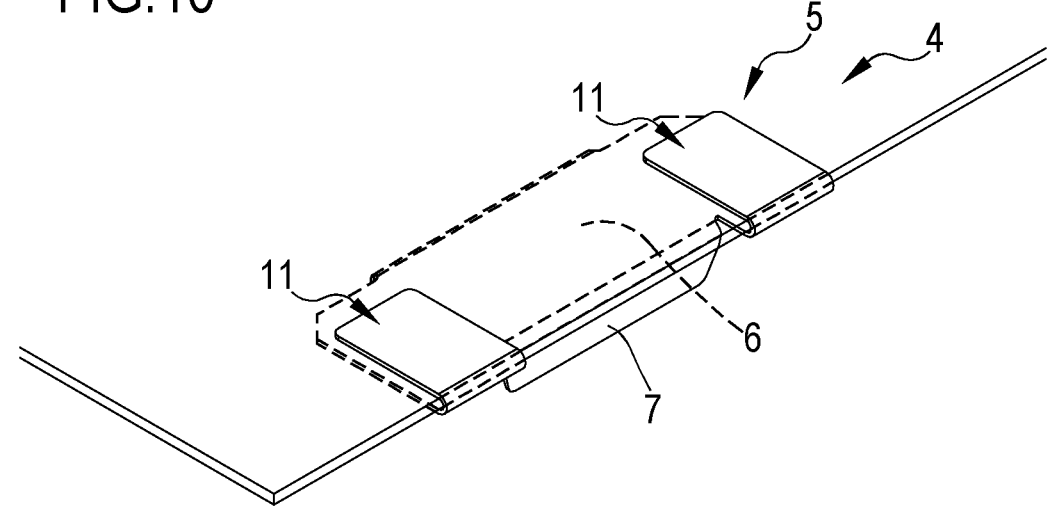

The first variant of the clip fastener 5 of FIGS. 8-10 differs from that of FIGS. 1-7 in that the connecting devices 11 are defined by two flaps developing from opposite edges of the main portion 6 other than the edges from which the tabs 7 are developed. Each of said flaps is shaped (folded in two) to delimit a respective recess 14 configured to receive the edge of the interchangeable insert 4. In particular, an upper portion is folded over a lower portion of each flap and the insert interposed between said lower portion and said upper portion. Said flaps are also devoid of safety appendages 15.

Figure 11:
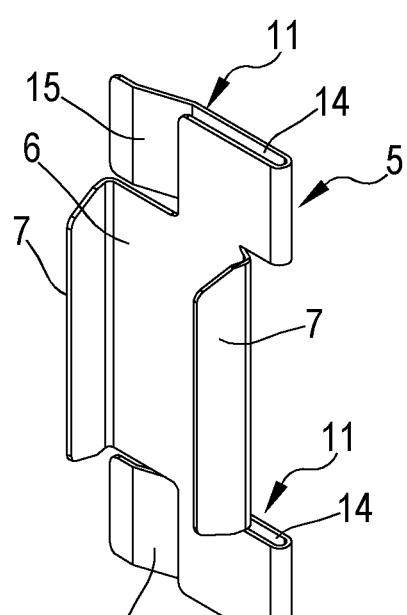
FIGS. 11, 12 and 13 illustrate a second variant of the element shown in FIGS. 3 and 4.
Figure 12:
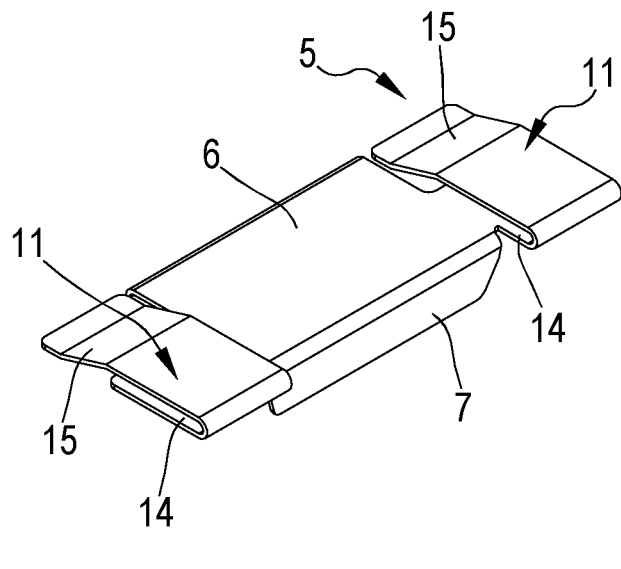
Figure 13:
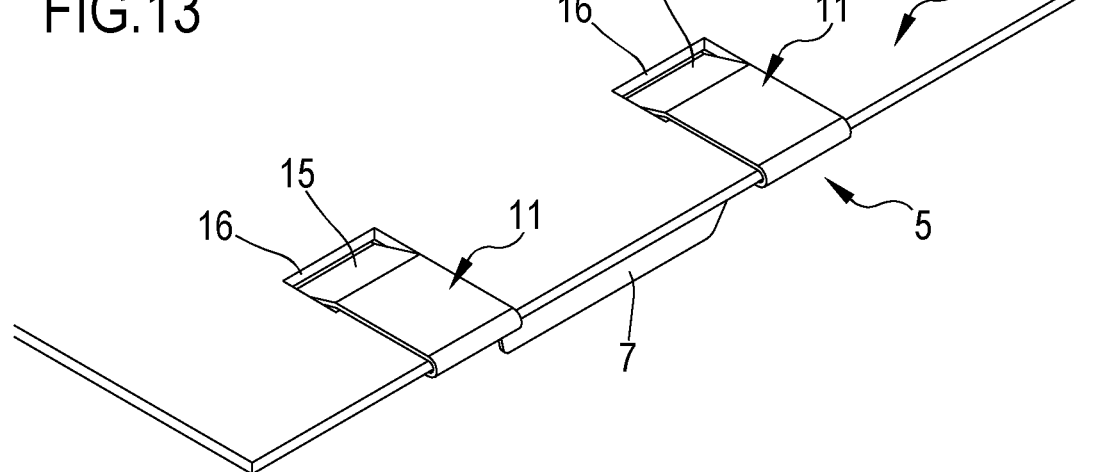

The second variant of the clip fastener 5 of FIGS. 11-13 is similar to the first variant of FIGS. 8-10. Compared to the first variant, the second variant is further provided with a safety appendage 15 on each of the two flaps. In particular, the safety appendage 15 is formed on a distal end of each of the two flaps and engages in a respective through opening 16 formed in the interchangeable insert 4 (FIG. 13).

Figure 14:
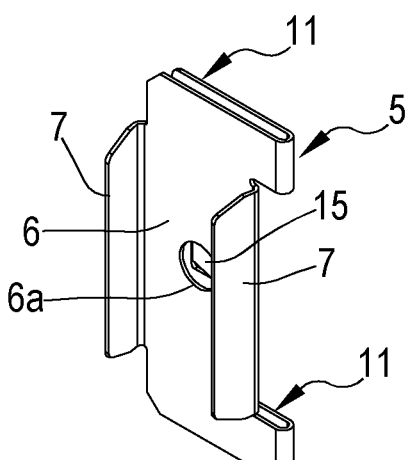
FIGS. 14, 15 and 16 illustrate a third variant of the element shown in FIGS. 3 and 4.
Figure 15:
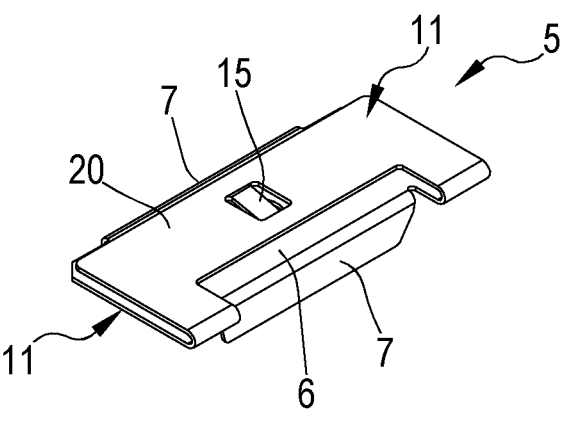
Figure 16:
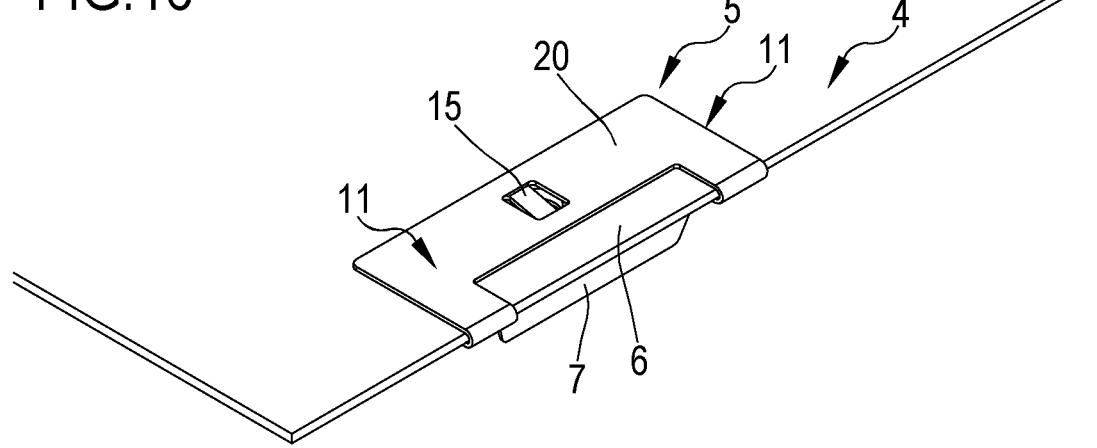

The third variant of the clip fastener 5 of FIGS. 14-16 is similar to the first variant of FIGS. 8-10. With respect to the first variant, the upper portions of the two flaps are mutually connected to each other by an intermediate portion 20 in which the safety appendage 15 is provided. Furthermore, a hole 21 in the main portion 6 allows access to said safety appendage 15 when the clip fastener 5 is mounted on the interchangeable insert 4 in order to disengage the safety appendage 15 from the through opening 16 obtained in the interchangeable insert 4 and to remove the clip fastener 5 from said interchangeable insert 4.

The fourth variant of the clip fastener 5 of FIGS. 17-19 is similar to the third variant of FIGS. 8-10. With respect to the third variant, the safety appendage 15 is formed in the main portion 6 instead of in the intermediate portion 20.

The fifth variant of the clip fastener 5 of FIGS. 20-22 differs from that of FIGS. 1-7 in that the flap is not cut out from the main portion 6 but is developed from one of the edges of the main portion 6 from which two tabs 7 are also developed and remain disposed at the sides of said flap. Furthermore, as in the fourth variant of FIGS. 17-19, the safety appendage 15 is fashioned in the main portion 6.

The sixth variant of the clip fastener 5 of FIGS. 23-25 differs from the fifth variant of FIGS. 20-21 in that the flap has a rounded profile and the security appendage 15 is more displaced towards the outer edge of the interchangeable insert 4.

Figures 26, 27, 28:
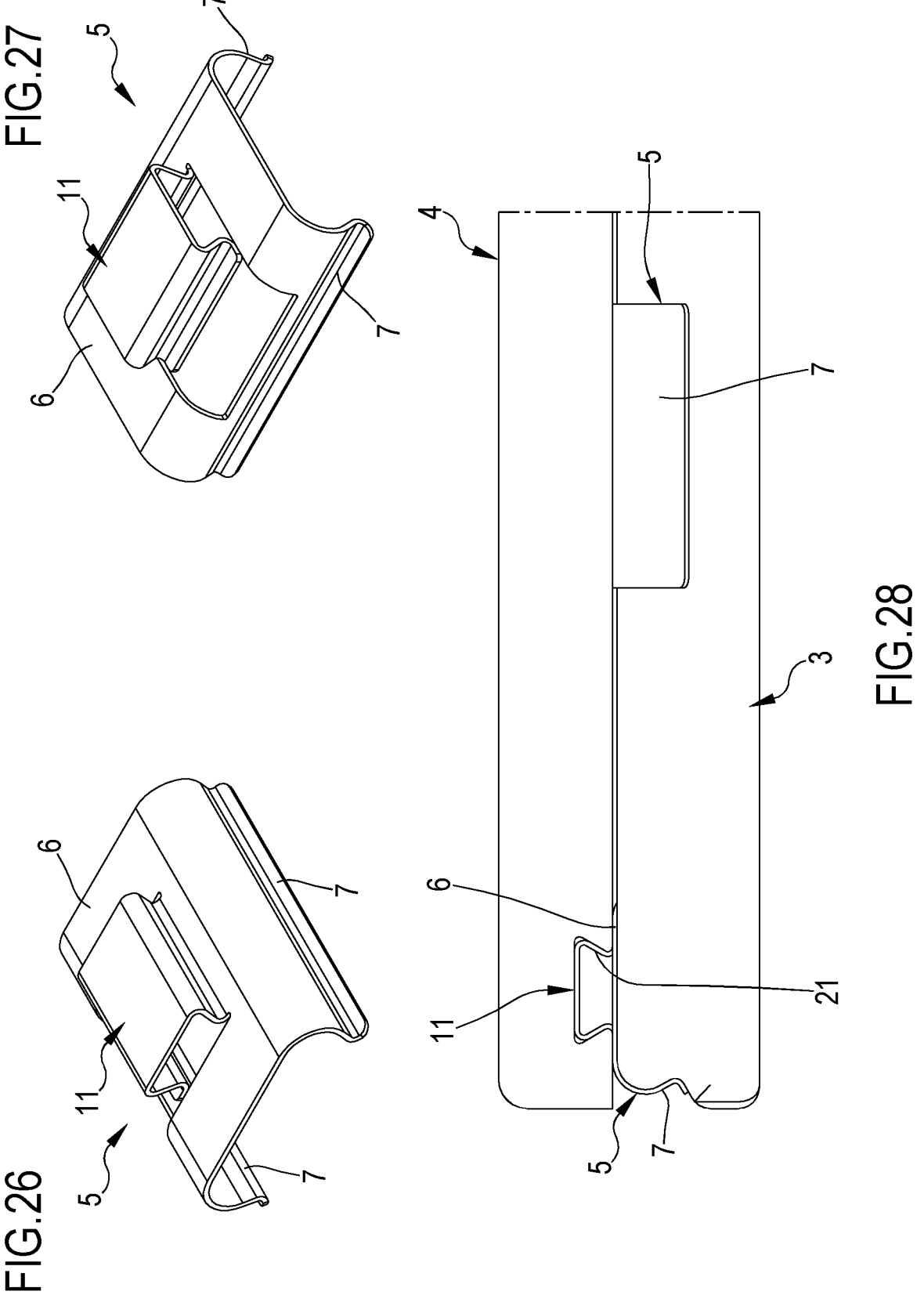
FIGS. 26 and 27 illustrate a seventh variant of the element shown in FIGS. 3 and 4.
FIG. 28 is a partial side view of a further embodiment variant of the baking pan according to the present invention associated with the element of FIGS. 26 and 27.

The seventh variant of the clip fastener 5 of FIGS. 26-28 is attached to the interchangeable insert 4 with a different system from that of the previous figures. In fact, the flap is cut out from the main portion 6 (as in FIGS. 1-6) but is shaped so as to form a dovetail profile (better visible in FIG. 28) disposed above the main portion 6. Moreover, the dovetail flap is connected only at one end to the main portion 6 so that it can deform elastically to snap engage into a housing 21 made on a lower face of the interchangeable insert 4 (FIG. 28).

Figures 29, 30:
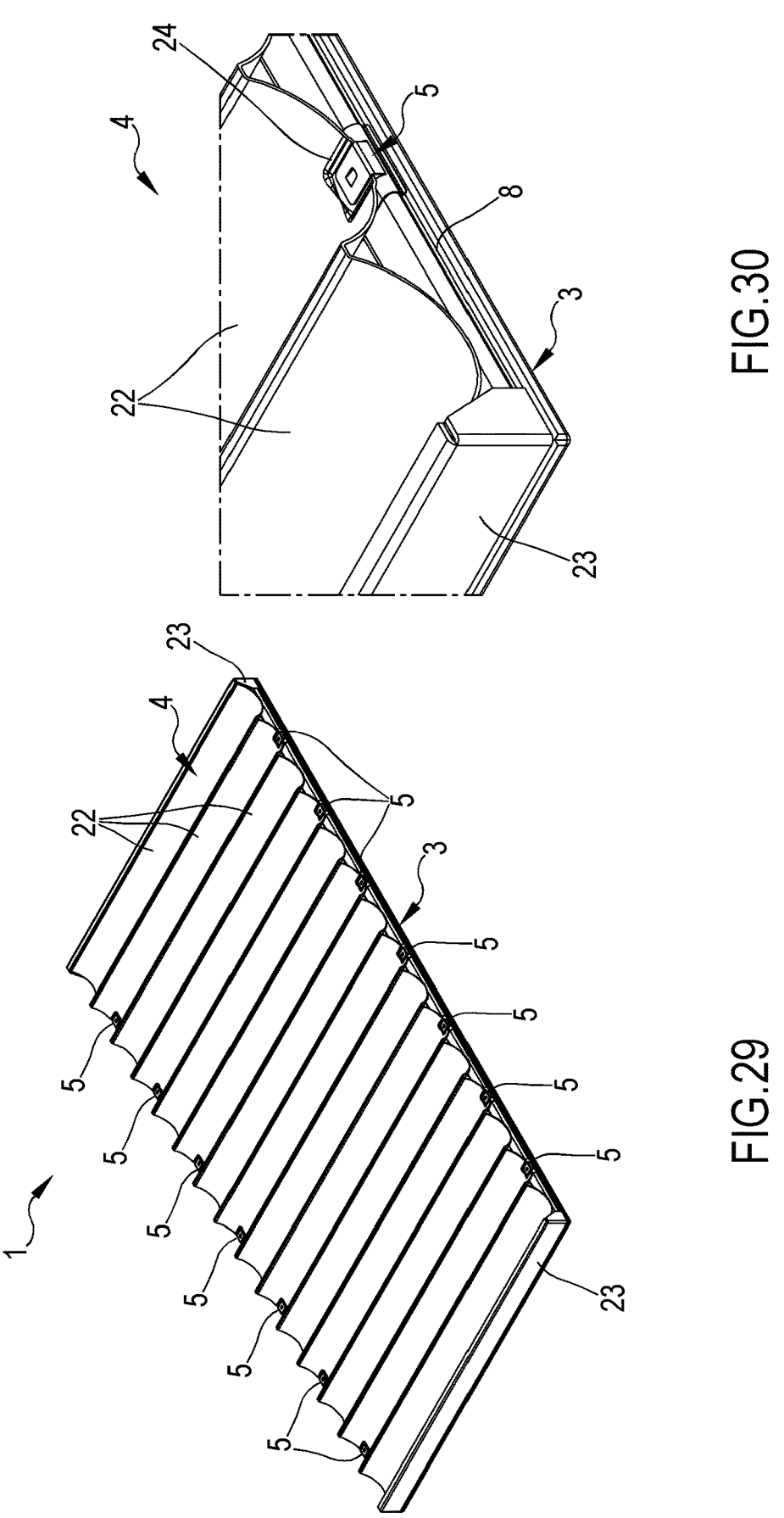
FIG. 29 illustrates a different embodiment of the industrial baking pan with interchangeable insert according to the present invention.
FIG. 30 is an enlargement of a portion of the baking pan of FIG. 29.

The different embodiment of the industrial baking pan 1 illustrated in FIGS. 29 and 30 differs from those described above in that the interchangeable insert 4 is a corrugated plate delimiting concavities 22 suitable for receiving the products to be baked. Said industrial baking pan 1 has two side bars 3 shaped to receive the clip fasteners 5 and two head profiles 23 having a different shape from the bars 3 and which are not configured for the attachment of said clip fasteners 5. Furthermore, as can be seen in FIG. 30, at an edge of the interchangeable insert 4 and at the bottom of some of the concavities 22 are shaped depressions 24 in which clip fasteners 5 find a place. The clip fasteners 5 of this embodiment are substantially the same as those of FIGS. 1-6.

The eighth variant of the clip fastener 5 of FIGS. 31-33 is specifically dedicated to the interchangeable insert 4 in the form of a corrugated plate and comprises two flaps extending from opposite edges of the main portion 6 other than the edges from which the tabs 7 develop and are inclined with respect to the main portion 6 to accommodate, like a cradle, one of the corrugations of the interchangeable insert 4 (FIG. 33). The interchangeable insert 4 rests on the two flaps and possibly also on the main portion 6 and is welded to the two flaps.

The ninth variant of the clip fastener 5 of FIGS. 34-36 is identical to the eighth variant of FIGS. 31-33 except that the two flaps have holes 25 for being riveted (via rivets 26) to the interchangeable insert 4.

The tenth variant of clip fastener 5 of FIGS. 37-39 is similar to the eighth variant of FIGS. 31-33 and the ninth variant of FIGS. 34-36 but, instead of welds and rivets, the flaps are provided with folded flaps similar to those of FIGS. 8-10.

The eleventh variant of the clip fastener 5 of FIGS. 40-42 is similar to that of FIGS. 20-22 except that the second portion 13 of the flap has lateral portions inclined to fit the curvature of the concavity 22 (FIG. 42).

In variant embodiments, the clip fastener 5, instead of being made from a single piece of suitably cut, bent and shaped sheet metal, can be made in another manner, for example it can be made of molded plastic resistant to high temperatures.

The bar 3 of FIG. 43 is similar to that of FIGS. 5 and 6 but has a more flattened, rectangular section.

The bar 3 of FIG. 44 has a rectangular cross-section and the seats 8 are ashlars/recesses which do not pass through the perimeter wall of the bar 3 and are located at discrete positions of the bar 3, i.e. they do not extend along its entire length. Furthermore, such ashlars/recesses are formed at an edge between the top surface and the side surfaces. The ashlars/recesses also have a length greater than a length of the clip fasteners, measured along the longitudinal extension of the bar, in order to allow some mutual sliding between the interchangeable insert 4 and the perimeter frame 2 in case of possible different thermal expansion due to the different materials.

The bar 3 of FIG. 45 has a square cross-section and ashlars/recesses formed at an edge between the top surface and the side surfaces but with a different outline from those of FIG. 44.

The bar 3 of FIG. 46 has a rectangular cross-section and ashlars/recesses formed only on the side surfaces of the bar 3.

In embodiments not illustrated but nevertheless falling within the scope of the present invention, the interchangeable insert 4 may comprise a plurality of interchangeable inserts juxtaposed with each other and mounted on the same frame 2.

LIST OF ELEMENTS

1 industrial baking pan with interchangeable insert
2 perimeter frame
3 bar
4 interchangeable insert
5 clip fastener
6 main portion
6a opening in the main portion
7 tabs
8 seat
9 closed perimeter wall
10 internal cavity
11 connecting devices
12 first portion flap
13 second portion flap
14 recess
15 safety appendage
16 through opening
17 terminal end safety appendage
18 interior surface through opening
19 bottom plate
20 portion
21 housing
22 concavity
23 head profile
24 depression
25 hole
26 rivet

The invention claimed is:

1. An industrial baking pan, comprising:
a perimeter frame comprising at least one bar, and a plurality of seats;
at least one interchangeable insert delimiting a support surface for a product to be baked, the insert being removably attachable to the perimeter frame;
a plurality of clip fasteners connectable to the at least one interchangeable insert; wherein
each of the clip fasteners comprises a substantially U-shaped cross section with tabs; and the clip fasteners are configured to be snap-engageable with the perimeter frame at the seats with the tabs positioned on opposite lateral sides of the bar.

2. The pan according to claim 1, wherein the seats are recesses that are part of an outer surface of the at least one bar.

3. The pan according to claim 1, wherein the seats extend continuously along a length of the at least one bar or are located at discrete positions of the at least one bar.

4. The pan according to claim 1, wherein the at least one bar comprises a closed perimeter wall delimiting an internal cavity and wherein the seats are non-through recesses formed in the closed perimeter wall.

5. The pan according to claim 1, wherein each of the clip fasteners comprises connecting devices configured to connect the clip fastener to the at least one interchangeable insert.

6. The pan according to claim 5, wherein each of the clip fasteners comprises a main portion, and at least two of the tabs extend from opposite edges of the main portion.

7. The pan according to claim 6, wherein the connecting devices are disposed on the main portion.

8. The pan according to claim 6, wherein, when the pan is assembled, the main portion of each of the clip fasteners is interposed between the at least one interchangeable insert and the at least one bar.

9. The pan according to claim 6, wherein the connecting devices comprise at least one flap.

10. The pan according to claim 9, wherein the at least one flap is shaped to delimit a recess configured to receive an edge of the at least one interchangeable insert.

11. The pan according to claim 10, wherein the at least one flap has a safety appendage engaged or configured to engage in a cavity of the at least one interchangeable insert when the edge of the at least one interchangeable insert is positioned in the recess.

12. The pan according to claim 5, wherein the connecting devices comprise: welds, rivets, interlocks or snap-on couplings.

13. The pan according to claim 1, wherein each of the clip fasteners comprises a single piece of shaped material.

14. The pan according to claim 13, wherein the single piece of shaped material is cut and folded or stamped.

15. The pan according to claim 1, wherein each of the tabs has a shape at least partially complementary to a shape of the respective seat.

\* \* \* \* \*